US010419410B2

(12) United States Patent
Govindan et al.

(10) Patent No.: US 10,419,410 B2
(45) Date of Patent: Sep. 17, 2019

(54) AUTOMATIC GENERATION OF UNIQUE IDENTIFIERS FOR DISTRIBUTED DIRECTORY MANAGEMENT USERS

(71) Applicant: Seagate Technology LLC, Cupertino, CA (US)

(72) Inventors: Deivapalan Perumal Govindan, Madurai (IN); Christopher David Gouge, Oviedo, FL (US)

(73) Assignee: Seagate Technology LLC, Cupertino, CA (US)

( * ) Notice: Subject to any disclaimer, the term of this patent is extended or adjusted under 35 U.S.C. 154(b) by 266 days.

(21) Appl. No.: 15/379,721

(22) Filed: Dec. 15, 2016

(65) Prior Publication Data

US 2018/0176200 A1   Jun. 21, 2018

(51) Int. Cl.
*H04L 29/06* (2006.01)
*H04L 29/12* (2006.01)
*H04L 29/08* (2006.01)

(52) U.S. Cl.
CPC ........ *H04L 63/062* (2013.01); *H04L 61/1523* (2013.01); *H04L 63/083* (2013.01); *H04L 61/3005* (2013.01); *H04L 61/3065* (2013.01); *H04L 67/1097* (2013.01)

(58) Field of Classification Search
CPC . H04L 63/062; H04L 61/1523; H04L 63/083; H04L 61/3065; H04L 61/3005; H04L 67/1097
See application file for complete search history.

(56) References Cited

U.S. PATENT DOCUMENTS

| 6,363,372 | B1* | 3/2002 | Lichterman | ....... G06F 16/90344 |
| 6,408,306 | B1 | 6/2002 | Byrne et al. | |
| 7,016,945 | B2 | 3/2006 | Bellaton et al. | |
| 7,240,211 | B2 | 7/2007 | Hillhouse | |
| 7,945,942 | B2* | 5/2011 | Perlman | .............. G06F 21/6218 726/1 |
| 7,996,674 | B2 | 8/2011 | Jain | |
| 8,108,523 | B2* | 1/2012 | Kinder | .............. H04L 29/12283 709/226 |
| 8,312,088 | B2* | 11/2012 | Pinto | ................... G06F 13/4247 709/206 |
| 8,364,957 | B2 | 1/2013 | Andreev et al. | |
| 8,611,124 | B2* | 12/2013 | Park | ........................ G11C 5/02 365/191 |

(Continued)

*Primary Examiner* — David Garcia Cervetti
(74) *Attorney, Agent, or Firm* — Kagan Binder, PLLC (57) ABSTRACT

A controller is configured to perform various steps including receiving a plurality of user identification values. Another step includes determining a first range of the plurality of user identification values, the first range including a first minimum user identification value and a first maximum user identification value. Another step includes assigning a first user identification value to a first user from the first range of the plurality of user identification values to a first user based on the first minimum and maximum user identification values. Another step includes determining a second user identification value from the first range of the plurality of user identification values by incrementing the first user identification value based on the first minimum and maximum identification values. Yet another step includes assigning the second user identification value to a second user.

20 Claims, 7 Drawing Sheets

(56) References Cited

U.S. PATENT DOCUMENTS

| | | | |
|---|---|---|---|
| 8,745,697 B2 | 6/2014 | Sakakibara | |
| 8,875,255 B1* | 10/2014 | Dotan | G06F 21/31 713/182 |
| 8,935,805 B2 | 1/2015 | Hazlewood et al. | |
| 8,965,340 B1* | 2/2015 | Biger-Levin | H04W 12/06 455/411 |
| 9,069,979 B2 | 6/2015 | Srinivasan et al. | |
| 9,081,951 B2 | 7/2015 | Sondhi et al. | |
| 9,384,485 B1* | 7/2016 | McDonald | G06Q 20/401 |
| 2001/0052013 A1* | 12/2001 | Munguia | G06F 11/0709 709/225 |
| 2002/0154144 A1* | 10/2002 | Lofgren | G06T 1/0071 345/634 |
| 2003/0041154 A1 | 2/2003 | Tran | |
| 2004/0003241 A1* | 1/2004 | Sengodan | H04L 63/08 713/168 |
| 2004/0044738 A1* | 3/2004 | Ohno | H04L 29/06 709/206 |
| 2004/0162786 A1* | 8/2004 | Cross | G06F 21/33 705/59 |
| 2004/0267670 A1 | 12/2004 | Minyailov | |
| 2005/0066191 A1 | 3/2005 | Thibadeau | |
| 2006/0015930 A1* | 1/2006 | Shoham | H04L 63/0823 726/6 |
| 2006/0085089 A1* | 4/2006 | Koh | G06Q 10/06 700/115 |
| 2006/0129816 A1* | 6/2006 | Hinton | G06F 21/41 713/169 |
| 2007/0156945 A1* | 7/2007 | Nakata | G11B 20/10 711/4 |
| 2008/0005779 A1* | 1/2008 | Takenaka | G06F 21/6218 726/1 |
| 2008/0013490 A1* | 1/2008 | Laroia | H04W 72/042 370/331 |
| 2008/0014975 A1* | 1/2008 | Jin | H04W 72/042 455/511 |
| 2009/0132554 A1* | 5/2009 | Nagoya | G06F 16/9535 |
| 2009/0275354 A1* | 11/2009 | Bulmer | G06F 1/3203 455/522 |
| 2010/0178896 A1* | 7/2010 | Terrero Diaz-Chiron | H04L 12/14 455/405 |
| 2010/0211657 A1* | 8/2010 | Kinder | H04L 29/12283 709/221 |
| 2012/0294307 A1* | 11/2012 | Fujihira | H04L 45/7453 370/389 |
| 2013/0145299 A1* | 6/2013 | Steimle | G16H 10/40 715/771 |
| 2013/0254395 A1* | 9/2013 | Chen | H04W 12/08 709/225 |
| 2014/0114748 A1* | 4/2014 | Bruich | G06Q 30/0246 705/14.45 |
| 2014/0215007 A1* | 7/2014 | Rash | H04L 67/1002 709/217 |
| 2015/0081837 A1* | 3/2015 | Bernier | H04W 8/24 709/217 |
| 2015/0116610 A1 | 4/2015 | Jiang et al. | |
| 2015/0235037 A1* | 8/2015 | Schentrup | G06F 21/6218 726/28 |
| 2015/0269207 A1* | 9/2015 | Deng | H04L 61/2038 707/696 |
| 2016/0014138 A1 | 1/2016 | Shapiro | |
| 2016/0072793 A1* | 3/2016 | Brock | G06F 16/951 726/6 |
| 2017/0004527 A1* | 1/2017 | Wu | G06Q 30/0255 |
| 2018/0075081 A1* | 3/2018 | Chipman | G06Q 20/367 |
| 2018/0082077 A1* | 3/2018 | Schentrup | G06F 21/6218 |

* cited by examiner

AUTOMATIC GENERATION OF UNIQUE IDENTIFIERS FOR DISTRIBUTED DIRECTORY MANAGEMENT USERS

BACKGROUND

The present disclosure relates to aspects of electronic directories, and relates in particular to improvements to the use of automatically-generated user identifiers within electronic directories.

Electronic data stores and computerized directories have begun to utilize distributed aspects, where directory functionality and data itself is spread over multiple servers, networks, etc. Distributed directories may benefit from increased high-volume and globalized capability, and may dynamically replicate entries as needed. Some temporary inconsistencies may exist between machines in distributed models for a short amount of time, but any inconsistencies are typically addressed quickly. However, as electronic directories proliferate, a relative disorder of platform or company-specific versions led to an eventual need for a platform-independent, standardized, and Internet-connected model. The X.500 directory standard, which runs on Open Systems Interconnection (OSI), accomplishes some of the goals, but has known drawbacks. For one, X.500 runs on the OSI protocol stack (as opposed to the widely-used transmission control protocol and Internet protocol suite (TCP/IP) or other connection-oriented transfer service), and had robust, or "heavyweight," features and capacities that were often neither needed nor used.

Lightweight directory access protocol (LDAP) was developed to be an application and distributed directory access protocol that could be used across platforms and/or organizations, among other flexibilities. Generally speaking, the formulation of LDAP eschews various components and functionalities of the broader-scope X.500, while streamlining others (e.g., the shift from OSI to TCP/IP), leading to an efficient, and widely-disseminated protocol for distributed or large-scale directory management. LDAP utilizes a client-server model, whereby a user (or a device) can connect to any of several servers and still access the same entry, in the form of a global directory service. In order to keep entries organized and logically laid out, LDAP entries are generally arranged in a hierarchical tree-like structure, and ordering of entries is not typically required.

A general purpose and goal of LDAP, unlike some other database-type formats, relates to streamlining and improving usefulness and efficiency in directories, generally including information relating to individuals, stored in the form of entries. The various entries (which may represent, for example, individuals) are assigned a unique identifying name (called a distinguished name (DN)), details and characteristics, such as a first and/or last name, user role, phone number, email address, employee number, office location, common name, home directory, password, etc.

In order to run large-scale, global, or distributed databases or data systems, various computer systems, including high-performance computing (HPC) implementations, have become increasingly integrated. The implementation of HPCs, among others, has led to an increase in various administrative and management demands related to database and directory models. Due to issues with permissions of administrator accounts, security-related aspects often have inherent vulnerabilities. To improve security, in particular, LDAP may be employed as a back-end to store and authenticate the multiple created administrative accounts.

LDAP often utilizes one or more so-called "schemas" related to various tasks or directory functions, LDAP also employs entries, which may be prescribed and governed by a schema. A schema is often a grouping of fundamental information categories known as entries. Each schema is composed of mandatory and/or optional entry information categories and which may serve as frameworks or templates for various directory-related database organizations. An entry, for the purposes of the LDAP framework, include attributes which may have a name and one or more values related to an object (e.g., an employee, administrator, system, etc.). The attributes may include qualities or names related to the object in question, such as a unique, user identifier (UID) for a particular user's account, among many other attributes. A UID, as the name implies, is typically an identifier or serial number that identifies a user entry (e.g., a human user or device), and a UM may be referred to as a distinguished name (DN) (including a full filesystem file path), or a relative distinguished name (RDN) (the relevant filesystem file name in its relevant parent folder). A DN may change over time, as needed, for example if an entry is moved from one location to another.

At present, administrator(s) typically must provide, assign, and/or create UIDs manually, a process that is prone to errors among other problems. As such, it has become increasingly important to devise a method for generating (e.g., in conjunction with the LDAP ADD operation) UIDs and adding associated entries without problematic overwrites, collisions, security concerns or other problems. Generally, the ADD operation involves the insertion a new entry (e.g., a UID) into a directory or server database. If the UID in the add request already exists in the directory, then the server will not or cannot add a duplicate entry, but may give an error or result code of "entry already exists." Typically, in order to add a new entry in an LDAP environment, the new entry to be added must not already exist, and the new entry's immediate superior in the hierarchy or directory must exist.

Various problems exist with respect to the capabilities and functionality of the existing state of the named account feature. Typically, there has been no enforcement of password expiration policy for a default administrator "admin" account. Additionally, there has typically been no enforcement to check the strength of the password. With regard to an audit of the administrator account, there typically has been no separate audit, with the possible exception of the unreliable bash history. Furthermore, typically there has been no separate account for other management-related access (e.g., with respect to reliability, availability, and/or service).

SUMMARY

In one aspect of the present disclosure, a system includes a controller operatively connected to at least a memory device and a storage device, the controller configured to perform various steps. The steps to be performed include receiving a plurality of user identification values. Another step to be performed includes determining a first range of the plurality of user identification values, the first range including a first minimum user identification value and a first maximum user identification value. Another step to be performed includes assigning a first user identification value to a first user from the first range of the plurality of user identification values to a first user based on the first minimum and maximum user identification values. Another step to be performed includes determining a second user identification value from the first range of the plurality of user identification values by incrementing the first user identification value based on the first minimum and maximum identification values. Yet another step to be performed includes assigning the second user identification value to a second user.

A second aspect of the present disclosure is directed to an account generation method. The method includes receiving a plurality of user identification values. The method also includes determining a first range of the user identification values, the first range including a first minimum user identification value and a first maximum user identification value. The method also includes assigning a first user identification value to a first user from the first range of the plurality of user identification values to a first user based on the first minimum and maximum user identification values. The method also includes creating a first user account based on the assigning the first user identification value to the first user. The method also includes determining a second user identification value from the first range of the plurality of user identification values by incrementing the first user identification value based on the first minimum and maximum identification values. The method also includes assigning the second user identification value to a second user. And, the method also includes creating a second user account based on the assigning the second user identification value to the second user.

A third aspect of the present disclosure is directed to a computer program product including a computer-readable storage device having a computer-readable program stored therein, where the computer-readable program, when executed on a computing device, causes the computing device to receive a plurality of user identification values. The computing device is also caused to determine a first range of the plurality of user identification values, the first range including a first minimum user identification value and a first maximum user identification value. The computing device is also caused to assign a first user identification value to a first user from the first range of the plurality of user identification values to a first user based on the first minimum and maximum user identification values. The computing device is also caused to create a first user account based on the assigning the first user identification value to the first user. The computing device is also caused to determine a second user identification value from the first range of the plurality of user identification values by incrementing the first user identification value based on the first minimum and maximum identification values. The computing device is also caused to assign the second user identification value to a second user. And, the computing device is also caused to create a second user account based on the assigning the second user identification value to the second user.

These and various other features and advantages will be apparent from a reading of the following detailed description.

BRIEF DESCRIPTION OF THE DRAWINGS

Other important objects and advantages of the present invention will be apparent from the following detailed description of the invention taken in connection with the accompanying drawings.

DETAILED DESCRIPTION

The foregoing specific embodiments of the present invention as set forth in the specification herein are for illustrative purposes only. Various deviations and modifications may be made within the spirit and scope of the invention without departing from the main theme thereof. For example, the methods and systems described herein are described in particular with regard to databases and directories, in particular. However, the methods of systems described herein may be applicable to many other instances for a unique identifier is desired to be determined without the assistance of a user, for the creation of accounts, for example.

The present invention overcomes various disadvantages and shortcomings of the prior art relating to the automatic generation of unique identifiers, and in particular to improved methods and systems for the automatic generation of new, collision-avoiding user identifiers (UIDs), especially within the industry-standard framework of LDAP. Collision-free, named-account-based UIDs can be generated automatically by continuously-incrementing numeric UIDs within holes or gaps within available ranges of UIDs within a preset range when a directory database is instantiated. By improving the known named-account feature, the uncertainties of the human element are reduced, and the risk of collisions and other computer-related problems are also reduced, improving performance and efficiency in database or directory-based tasks.

Previously, a single systems administrator and account would be sufficient to oversee an entire database or system. Faced with the management of a present-day HPC-based system, a single administrator logging into the manager may eventually become overworked or overwhelmed, leading to the necessary employment of additional administrators per database manager, system, network, server, and/or company. Even if a single administrator were not to be overwhelmed (e.g., in the case of a smaller company or organization), other causes have commonly led to a desire to segment the purview of various administrators, for a variety of reasons. Aspects related to security are common concerns in the realm of networks, computers, and the Internet, especially with respect to private or sensitive data. As such, a need has arisen to support multiple unique administrative accounts, one for each administrator, in order to manage clustered, distributed, and/or parallel storage systems. Some examples of a clustered storage system and manager are, respectively, ClusterStor® and the associated ClusterStor® manager products (and registered trademark) of Seagate Technology.

Directory schemas, as used with respect to LDAP, govern the contents of entries with respect to each schema, which is a set of definitions and constraints regarding the structure of the directory hierarchy. A schema may also define one or more object classes (ObjectClasses). Each entry typically has an ObjectClass attribute, containing named classes defined in the schema. The schema definition of the classes of an entry defines what kind of object the entry may represent, e.g., a person, organization, or domain. The ObjectClass definitions may also define the list of attributes that must contain values and the list of attributes An example of a typical LDAP implementation is OpenLDAP. OpenLDAP was developed by the OpenLDAP project as a free, open-source implementation of LDAP. It is released under the OpenLDAP public license and has three main components. The components include: SLAPD (also commonly written in lowercase italicized type as "slapd," which denotes stand-alone LDAP daemon, and associated modules and tools), libraries implementing the LDAP protocol and ASN.1 Basic Encoding Rules (BER), and client software (e.g., ldapsearch ldapadd, ldapdelete, and others). Various processes closely-related to LDAP schemas (e.g., an OpenLDAP posixAccount schema, defined in at least IETF RFC 2307) currently lack the facility to automatically create and/or assign UIDs for the new user accounts. For example, according to various IETFs, a uidNumber (e.g., a UID) is a MUST attribute field in an example posixAccount schema, which is reproduced, below:

```
objectclass (
    1.3.1.1.1.2.0
    NAME 'posixAccount'
    DESC 'Abstraction of an account with POSIX attributes'
    SUP top
    AUXILIARY
    MUST ( cn $ uid $ uidNumber $ gidNumber $ homeDirectory )
    May ( userPassword $ loginShell $ gecos $ description )
```

Examples of newly-created, user-specific accounts could be stored in LDAP using, for example, an OpenLDAP posixAccount schema. The posixAccount schema would expect a UID (i.e., uidNumber) attribute as an input during creation of the account. Expecting a UID as an input from user would be undesirable for several reasons, such as impersonation by a malicious imposter. For example, if one knows the administrator account username, then hacking the password may be more successfully attempted by malicious users. A desire arises, then, to internally or automatically generate the UID and provide it as an input to the schema in question.

The so-called "named account" directory and database feature is as a partial solution for assigning and creating new, user-specific UIDs and accounts. The named account feature provides various basic capabilities such as allowing for or providing individual administrator accounts per person or user, but the existing named account feature may also prohibit remote access through fixed (i.e., not subject to changing or rolling) passwords. The named account feature may also employ the automatic expiration of existing passwords, have a mandated minimum time between password changes, and have enforced password length and/or complexity. In addition, the named account feature may include provisions for password storage and access and may include separate credentials for application programming interface (API) access and include provisions for auditing of administrator user activity. As a result, with the named account feature, an organization can beneficially audit which user changed what in the system.

Figure 1A:
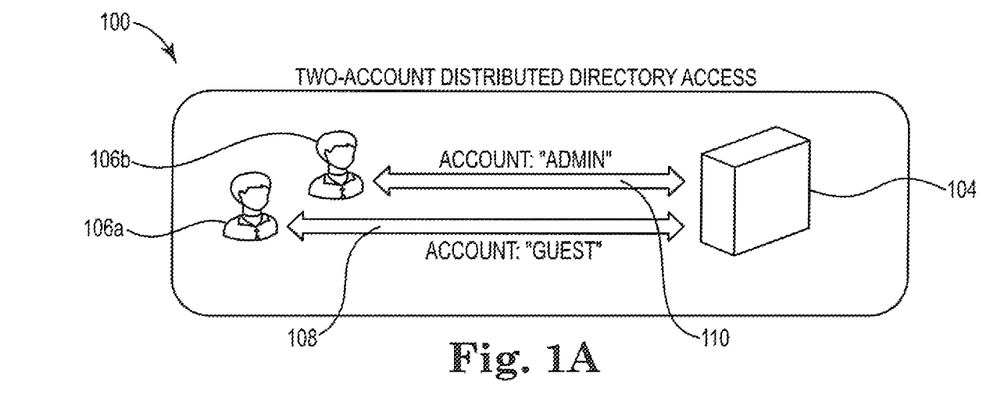
FIG. 1A is a conceptual illustration of a two-account structured distributed directory access scheme.

FIG. 1A is a conceptual illustration of a two-account structured distributed directory access scheme.

In order to implement various embodiments described with respect to this application, an example directory or database manager (not shown) may be stored on a computing device, such as server 104, and may include a single pane view of a distributed directory or database infrastructure, which may be visible to one or more administrators (e.g., various users 106). The manager may be used to simplify storage cluster installation and configuration and may provide a consolidated management and control of the storage cluster located on server 104. As such, the manager may include a controller configured to carry out methods described herein. A distributed directory or database manager (which may have a display) may be logged into by an administrator (e.g., user 106b) with an administrator account.

Currently, to log into the distributed directory (or database) manager located on server 104, the distributed directory provides a default administrator account that includes a default username and password, by which the administrator can log into the manager. Additionally, the distributed directory generally may provide a guest account login path (e.g., the guest may be user 106a). As shown, these are the only two accounts (or account types in some cases) through which the administrator 106b or other user 106a could log into the distributed directory on server 104 as either an administrator or guest. For large organizations or governments having hundreds of distributed directories or databases, managing the distributed infrastructure requires several administrative users 106b in their organization. Restricting the different administrative personnel to use the same default administrative account poses critical security risks. Users, as used herein, may be human users, such as employees or clients of a company or organization, and in some embodiments users may take other forms, including computer-based, virtual, machine, controller, or file system-instantiated users.

As shown, a traditional two-account-based scheme 100 includes two distinct connection paths from a user 106 to a server 104. Various users are designated as guests 106a and other may be designated as administrators 106b. In principle, a guest 106a, for various reasons, including security and accident-avoidance, is given reduced access and read/write capabilities with respect to directory data stored on server 104. A guest connection 108 may be configured to include an ability or functionality to, for example, access a read on various directory entries, such as a phone number of a fellow employee (not shown). However, an administrator connection 110 may include the capabilities of the guest connection 108, with the added capabilities of adding, modifying, and/or deleting directory entries, among other contents of server 104. Server 104 may represent a single server or a cluster of multiple servers, according to various embodiments.

Figure 1B:
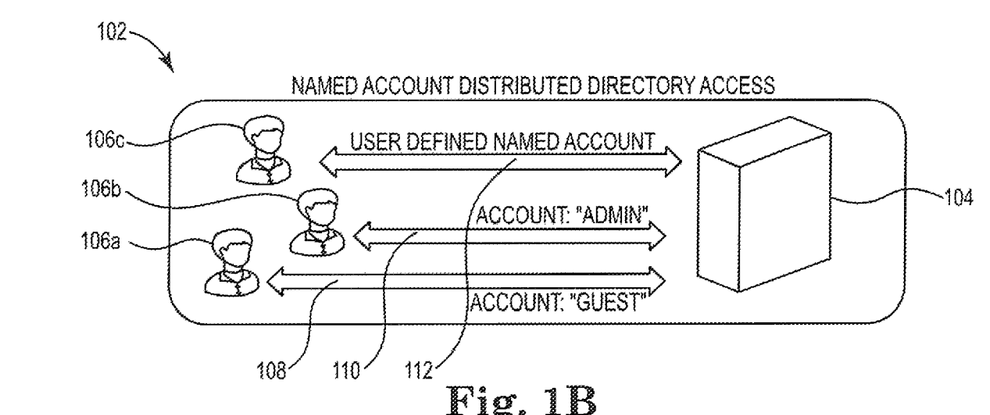
FIG. 1B is a conceptual illustration of a named account distributed directory access scheme.

FIG. 1B is a conceptual illustration of a named account distributed directory access scheme.

The named account feature, if employed as shown, enables the distributed directory manager to create user-defined administrator accounts (such as for user 106c). The shown user connection scheme 102 includes the elements as shown in FIG. 1A, while adding a third, user-defined, named account connection 112. A named-account user may desire to log into the server 104, and may be one of several administrators assigned to varying roles ranging from a guest (similar to guest 106a) to a partial or full administrator (similar to administrator 106b). One or more named account users 106c may have roles and/or responsibilities that vary, such as being assigned to a particular country's operation for a company, or to a particular division of a company. Various roles may be distributed to various named account users 106c, or several named account users 106c may alternatively each be considered full administrators in a distributed directory setting, for various reasons.

Figure 2:
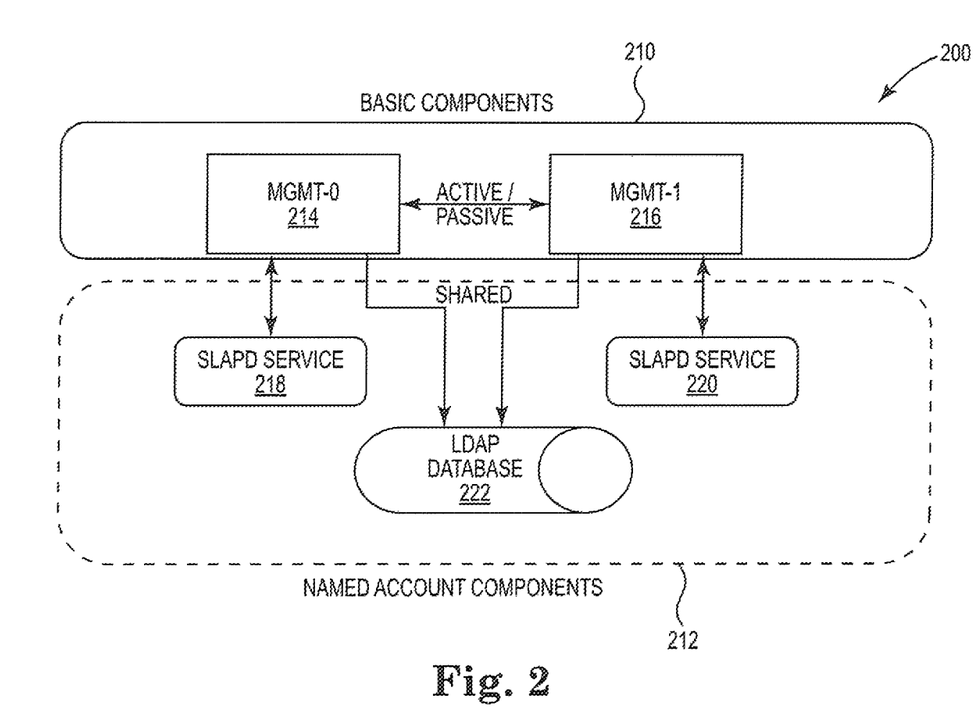
FIG. 2 is a schematic relational diagram showing database components in a distributed directory access scheme, according to various embodiments.

FIG. 2 is a schematic relational diagram 200 showing database components in a distributed directory access scheme, according to various embodiments.

As depicted, basic database or directory components (e.g., standard directory LDAP components) 210 include two management modules 214, 216, which are operably connected to each other, either passively and/or actively. As described herein, the management modules 214, 216 may operate to form a basic distributed directory, and additional management modules can be added, as desired. In other embodiments (e.g., a situation where a directory is not a distributed directory), a single management module 214 may be utilized without a second management module 216.

As shown, according to one embodiment representing named account structure, the management modules 214, 216 are both preferably connected to an LDAP database 222 operatively located within a named account components section 212. Also located within the named account components section 212 can be two standalone LDAP daemon (SLAPD) service modules 218, 220. SLAPD, as discussed above, may be an LDAP directory server that can be run on many different platforms. SLAPD can be used to provide a directory service with respect to a directory that can contain various entries.

Generally, SLAPD modules facilitate writing and/or modification within an LDAP framework. SLAPD generally includes two distinct parts; a front end that handles protocol communication with LDAP clients, and a module that handles specific tasks, such as database or directory operations. SLAPD may also be widely and flexibly configurable. The configuration of the SLAPD components, for example, may use a single configuration file, allowing an administrator to change virtually any aspect with respect to the directory or database. As shown, the respective SLAPD service modules are connected to a first management module 214 (MGMT-0) and a second management module 216 (MGMT-1).

The SLAPD service modules 218, 220 may each be stand-alone modules and in operative connection and communication with at least a respective management module 214, 216, as shown. Each SLAPD service module 218, 220 can be connected to a global LDAP directory service (not shown), or each may run an independent service, such as a directory-related service, according to various embodiments. According to some embodiments, the addition of SLAPD service modules 218, 220 may provide additional functionality regarding control aspects of a server (such as server 104 of FIGS. 1A-1B), allowing an administrator to control access to the information in the particular database(s), such as LDAP database 222.

Figure 3:
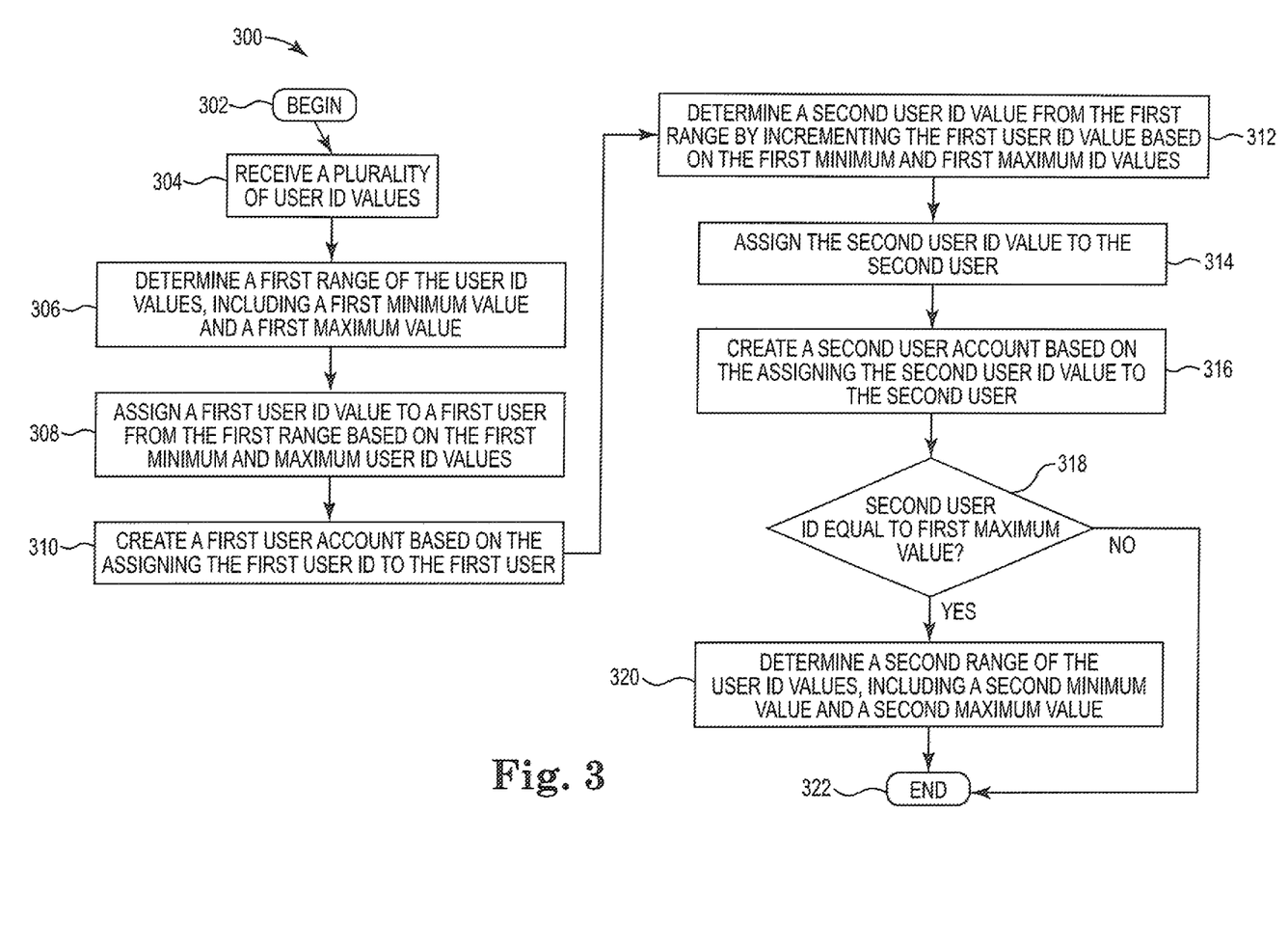
FIG. 3 is a flowchart for the automatic assignments of UIDs for administrator access to a distributed directory manager, according to various embodiments.

FIG. 3 is a flowchart for the automatic assignments of UIDs for administrator access to a distributed directory manager, according to various embodiments.

Various LTD values can be assigned automatically as UIDs by a process starting at 302. At 304, a plurality of user identifier (ID) values (e.g., UIDs) can be received. For example, prior to the receiving the plurality of UID values, the plurality of UID values can be selected such that the plurality includes substantially more UID values than are expected to be used or needed as UIDs for the foreseeable future. For example, if 100 UIDs are expected to be used in the next decade, a plurality of 1000 UIDs (or less or more) may be selected as a "safe" number of UID values during implementation of the processes, herein.

At 306, a first range of the UID values (e.g., to eventually be assigned as one or more UIDs to corresponding users or administrators, as described herein), including a first minimum UID value and a first maximum UID value may be determined. Once the plurality of UID values is received, a numerically lowest UID value may be determined to be a first minimum UID value, and a numerically highest UID value may be determined to be a first maximum UID value, thereby setting and/or determining the first range of UIDs as the range of UIDs between, and including, the first minimum UID value and the first maximum UID value.

At 308, a first UID value may be assigned to a first user (and associated entry) from the first range based on the first minimum and first maximum UID values. Once the first minimum and maximum UID are each determined, then, a controller (as described herein) may assign at least one of the UID values to a first user as a UID, based on the first range of UID values determined at 306.

At 310, a first user account may optionally be created based on the assigning the first UID to the first user (and the associated first user entry). The first user account may be an administrative, named-account, as described herein, and may include various privileges and/or features of various accounts, as described herein.

At 312, a second UID value may be determined from the first range by incrementing the first UID value based on the first minimum and first maximum ID values. Similar to the determining of the first UID value, the determination of the second UID value may follow the determination of the first UID value, and may be incrementally related to the first UID value, which may have been previously assigned at this step. At 314, a second UID value can be assigned to the second user as a second UID, similar to the assignment of the first UID value to the first user as the first UID. At 316, a second user account can optionally be created based on the assigning the second UID value to the second user, in a similar fashion to the creating of the creation of the first user account at 310.

At 318, it may be determined whether the second UID is equal to the first maximum UID value. If it is determined that the second UID is equal to the first maximum UID value, the process may end (or optionally repeat), according to various embodiments. If it is determined that the second UID is equal to the first maximum UID value, then a second range of the UID values may be determined, including a second minimum UID value and a second maximum UID value. The process may then end (or repeat), according to various embodiments. According to other embodiments, it may instead be determined at 318 that the second UID is equal to the first maximum UID value minus one (e.g., second to maximum UID value), or other UID value according to various embodiments.

Figure 4:
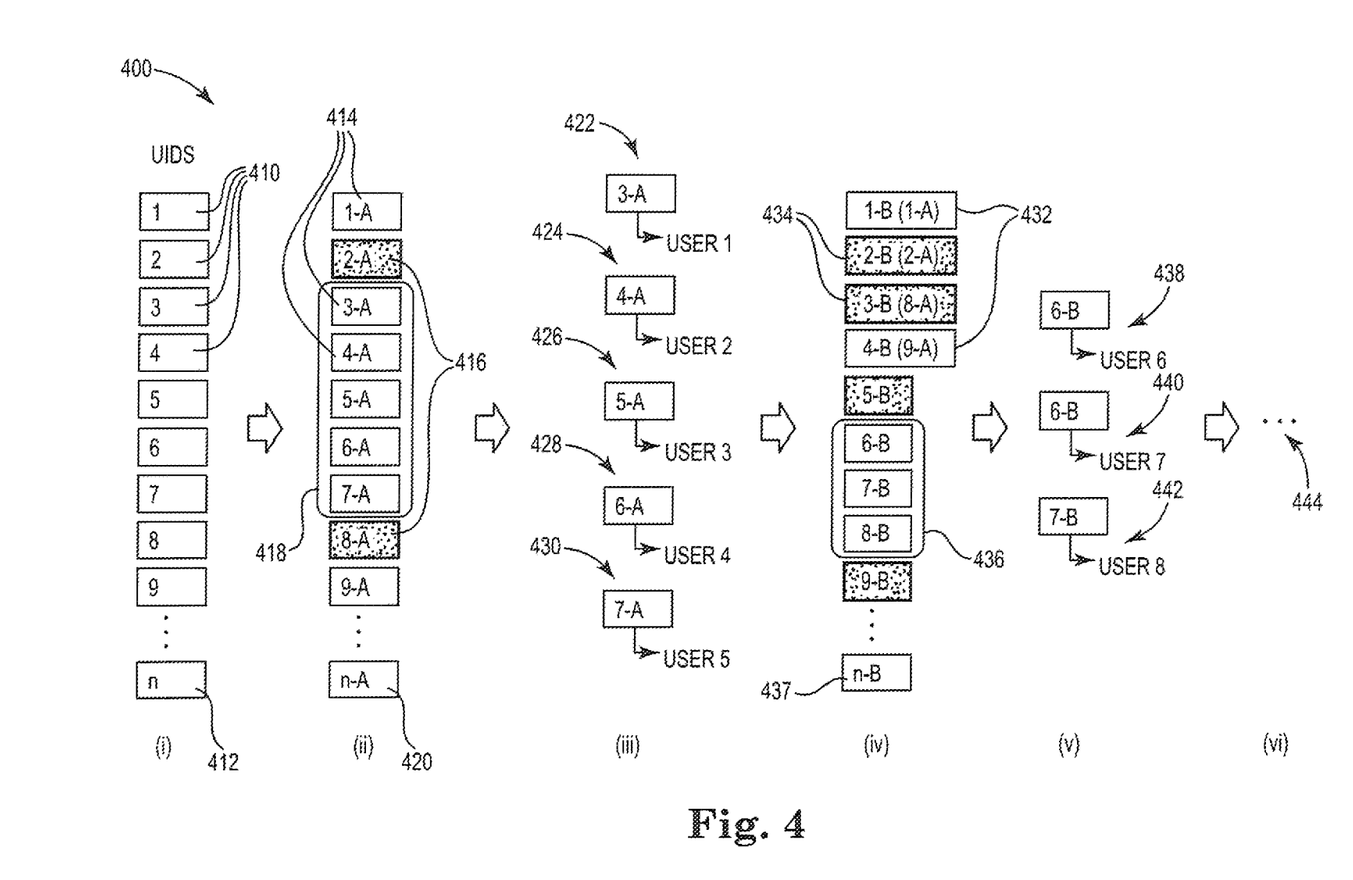
FIG. 4 is an illustration of an example UID assignment process in a distributed directory, according to various embodiments.

FIG. 4 is an illustration of an example UID assignment process 400 in a distributed directory, according to various embodiments.

As described herein, at step (i), an initial range of potential UIDs 410 (e.g., UID values) may be specified or received to begin a UID-assignment process within a named account feature. The initial range of UIDs 410 may include n UIDs, including an $n^{th}$ UID 412. As described herein, the initial range of UIDs 410 may be selected to be sufficiently large so as to generously accommodate present and future needs of UIDs. A large range may be specified in order to reduce the likelihood that a range would eventually become insufficient. A minimum range value (UID 1, as shown) may be selected arbitrarily, but may be selected such that a likelihood of the UID being already in use is reduced, for example, by selecting a UID that is substantially beyond any and all expected UIDs that would already be in use.

Following the initial assignment of range of potential UIDs 410, the various UIDs may be identified as being in use 416 or not currently in use 414. The UIDs within the initial range 410, both in use and not in use may all be designated in order to preferably identify a hole 418 containing a maximum consecutive number of available UIDs 414, though other holes may also be present. The $n^{th}$ UID 420 may be designated as available or in use. As shown, hole 418, as shown, includes four available consecutive UIDs 3-A (422), 4-A (424), 5-A (426), 6-A (428), and 7-A (430). At step (iii), starting with the first UID 3-A (422) of the hole 418, the UIDs 3-A (422), 4-A (424), 5-A (426), 6-A (428), and 7-A (430) are assigned to users 1-5, according to the ordering of the UIDs. In other words, user 1 is assigned UID 3-A 422, as shown, user 2 is assigned UID 4-A 424, user 3 is assigned UID 5-A 426, user 4 is assigned UID 6-A 428, and user 5 is assigned UID 7-A 430. As shown for illustrative purposes, the concatenation of the letter "A" to the numbered UID denotes a first determination of UIDs and the applicable usage status.

Following the assignment of the UIDs 3-A at 422 through 7-A at 430 to users 1-5 at step (iii), it is again determined which of the UIDs 410 are in use 434, and which of the UIDs are available 432. The newly-identified UIDs have an $n^{th}$ entry, n-B 437, as shown. A second hole 436 is then determined, in this case containing three available, consecutive UIDs 6-B (438), 7-B (440), and 8-B (442). Mirroring the process of step (iii), at step (v), the UIDs 6-B (438), 7-B (440), and 8-B (442) are assigned to the next three users, in this case users 6, 7, and 8. The process may then be optionally repeated at step (vi) as many (or as few) times as necessary, as illustrated by ellipsis 444. The process may preferably be repeated in particular when a new request for a UID or administrator account is received by a controller or manager, as described herein. As shown for illustrative purposes, the concatenation of the letter "B" denotes a second determination of UIDs and the usage status. Further determinations of usage status of UIDs may be performed, as desired.

Figure 5:
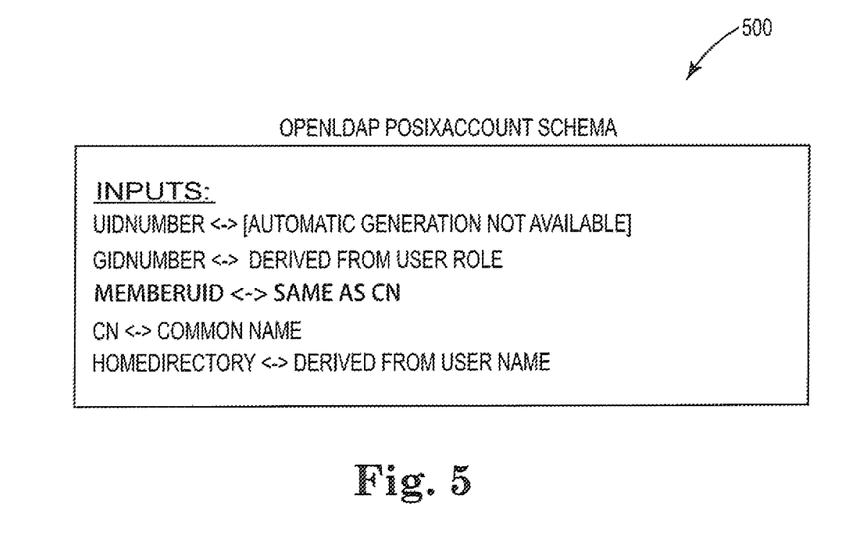
FIG. 5 is an example schema that can be employed with the automatic assignment of UIDs according to various embodiments.

FIG. 5 is an example schema that can be employed with the automatic assignment of UIDs, according to various embodiments.

As shown with respect to FIG. 5, a typical OpenLDAP posixAccount schema may be utilized for the purposes of this disclosure. Typically, the OpenLDAP posixAccount schema includes an entry with five mandatory attribute fields, including uidNumber (e.g., UID as used throughout this application), gidNumber (group identifier), memberUID (member identifier), cn (common name), and homeDirectory (e.g., a filesystem or internet address path). Optional attributes that not mandated by the shown schema may include userPassword (not shown), loginShell (not shown), and gecos (not shown), among others.

Figure 6:
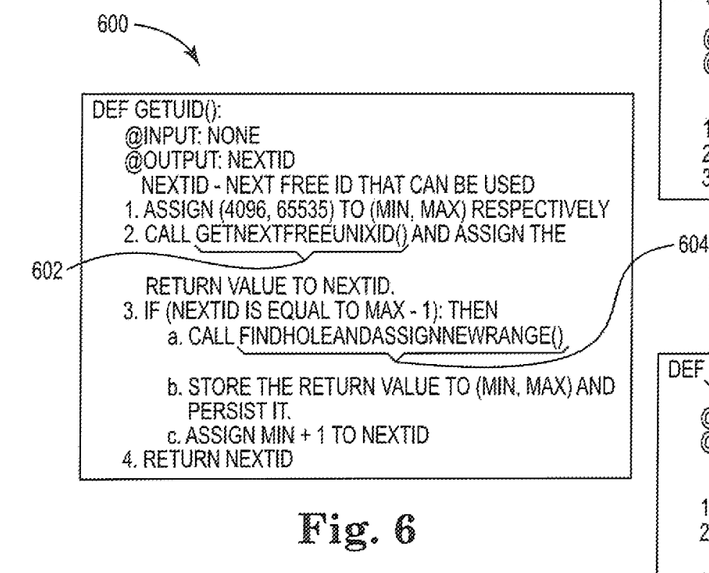
FIG. 6 is an example routine for assigning a UID, according to various embodiments.

FIG. 6 is an example routine 600 for assigning a UID, according to various embodiments.

A particular embodiment of the invention includes a four-step pseudocode routine (which may be in LDAP data interchange format, or LDIF) that contains a first step in which a minimum and maximum range are assigned, with 4096 assigned as an example minimum, and 65535 assigned as an example maximum. As discussed herein, the minimum, maximum, and resulting range can be chosen or determined arbitrarily, but can be chosen such that existing or in-use UIDs are avoided and/or that a maximum UID is selected that is sufficient to avoid future need for a greater maximum. Here, the range of possible UIDs from 4096-65535, spanning over 40,000 possible UIDs, is determined to be sufficient for this example by an administrator. The range may also be determined automatically, according to other embodiments.

Once the range of UIDs has been assigned, a function, such as getNextFreeUnixId( ) 602, can be called, assigning the return value to the next UID (nextId). If nextId is equal to the maximum UID (or, alternatively, the maximum UID of the range minus one), then another function, such as findHoleAndAssignNewRange( ) 604, can be called, returning a new range (e.g., 4099-65535, 5000-65535, 4099-65532, etc.) having a new minimum and maximum UID, and it may be persisted. The minimum UID plus one (increment) can then be assigned to nextId, and the next Id can be returned.

Figure 7:
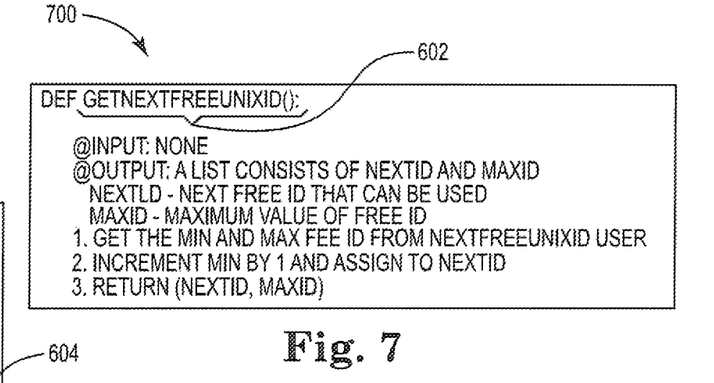
FIG. 7 is a subset of the example routine of FIG. 6, where the next free UID is assigned, according to various embodiments.
Figure 8:
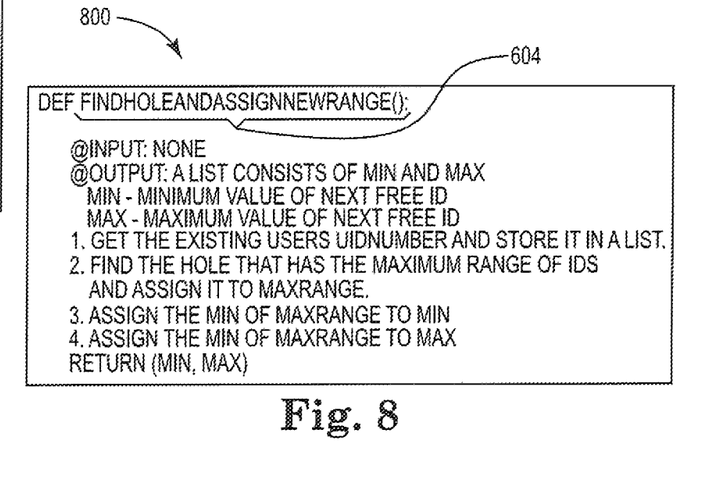
FIG. 8 is another subset of the example routine of FIG. 6, where a hole is found and a new range assigned, according to various embodiments.

Various routines having subroutines are also depicted, including getNextFreeUnixId( ) 602, and findHoleAndAssignNewRange( ) 604, embodiments of which are each further explained with respect to FIGS. 7 and 8, respectively.

FIG. 7 is a subset 700 of the example routine 600 of FIG. 6, where the next free UID is assigned, according to various embodiments.

The routine 600 of FIG. 6 includes several (e.g., LDIF) routines, including calling function getNextFreeUnixId( ) 602, which may contain three subroutine steps. As shown, getNextFreeUnixId( ) 602 includes getting the minimum and maximum free available or not in use) UID from NextFreeUnixId user, incrementing the minimum UID by one and assigning the resulting UID to nextId, and returning the nextId and the maxId. According to various embodiments, the incrementing of UIDs can be preferably by one unit, but may also be by any other number or interval. Alternatively, the incrementing can occur in reverse, starting with a maximum UID, and dis-incrementing the maximum UID value until a minimum UID value has been achieved.

According to various embodiments, in LDAP, the command "NextFreeUnixId" may be used for generating UIDs for new user accounts. The initial range of UIDs may range from be from "start_range" to "end_range," which may be initially set up during cluster installation. An LDAP process may start with the "start_range" and may increment until reaching the "end_range." Once the "end_range" is reached, the system or method (e.g., controller) preferably determines or identifies one or more applicable holes in the range and then preferably picks the largest hole range. The "start_range" and "end_range" are then preferably re-initialized with the obtained hole range. By following the described process, UID assignment collisions are avoided during automatic UID assignment, as desired.

FIG. 8 is another subset 800 of the example routine 600 of FIG. 6, where a hole is found and a new range assigned, according to various embodiments.

The findHoleAndAssignNewRange( ) 604 (e.g., LDIF) routine, as shown with respect to FIG. 6, can preferably include four (or more) subroutines. The subroutines of findHoleAndAssignNewRange( ) 604 can include determining or receiving the existing users' UIDs and storing them in a list, finding the hole that has the maximum range of UIDs, and assigning it to maxRange. Then, the minimum UID of maxRange can be assigned to the minimum UID, and the maximum of maxRange can be assigned to the maximum, and the minimum and maximum UID values can be returned, according to various embodiment.

Figure 9:
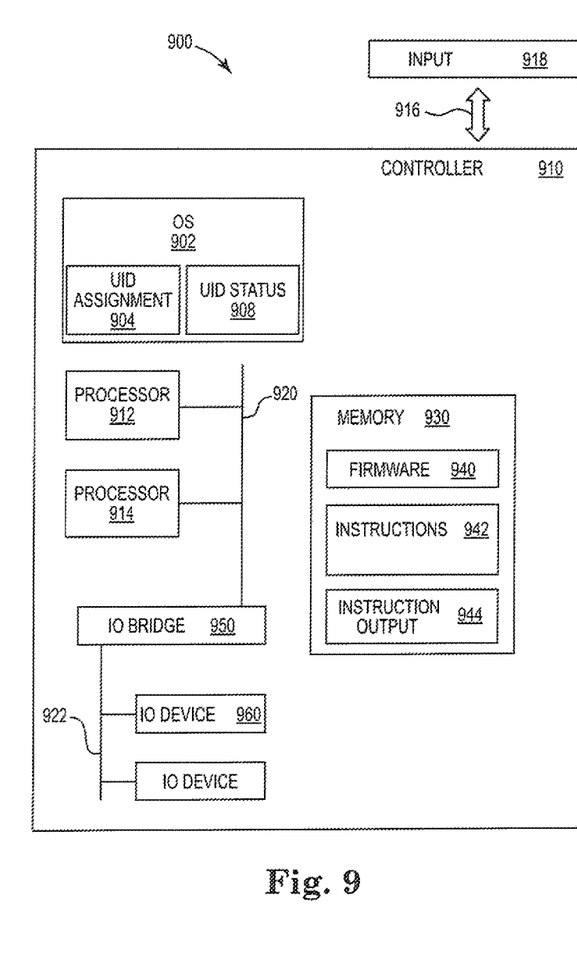
FIG. 9 depicts a computer system according to embodiments of the present disclosure.

FIG. 9 depicts a computer system 900 according to embodiments of the present disclosure.

Computer system 900 includes controller 910 having processors 912 and 914. In embodiments, each processor 912, 914 can be a single processor or a multi-threaded processor, a general purpose or a special purpose processor, a co-processor, or any of a variety of processing devices that can execute computing instructions. Server 104 of FIG. 1 may represent an embodiment of computer system 900. Computer system may also be a computing device or a controller, as used herein.

Computer system 900, as shown, is configured with an interface 916 to enable controller 910 to receive a request to assign a UID to a user as input 918, as described in particular with regard to FIGS. 3 and 4. In embodiments, the interface can enable controller 910 to receive, or otherwise access, 916 the input 918 via, for example, a network (e.g., an intranet, or a public network such as the Internet), or a storage medium, such as a disk drive internal or connected to controller 910. The interface can be configured for human input or other input devices, such as described later in regard to components of controller 910. It would be apparent to one of ordinary skill in the art that the interface can be any of a variety of interface types or mechanisms suitable for a computer, or a program operating in a computer, to receive or otherwise access or receive a source input or file.

Processors 912, 914 included in controller 910 are connected by a memory interface 920 to memory device or module 930. In embodiments, the memory 930 can be a cache memory, a main memory, a flash memory, or a combination of these or other varieties of electronic devices capable of storing information and, optionally, making the information, or locations storing the information within the memory 930, accessible to a processor. Memory 930 can be formed of a single electronic (or, in some embodiments, other technologies such as optical) module or can be formed of a plurality of memory devices. Memory 930, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 900 can include a plurality of memory devices. A memory interface, such as 920, between a one or more processors and one or more memory devices can be, for example, a memory bus common to one or more processors and one or more memory devices. In some embodiments, a memory interface, such as 920, between a processor (e.g., 912, 914) and a memory 930 can be point to point connection between the processor and the memory, and each processor in the computer 900 can have a point-to-point connection to each of one or more of the memory devices. In other embodiments, a processor (for example, 912) can be connected to a memory (e.g., memory 930) by means of a connection (not shown) to another processor (e.g., 914) connected to the memory (e.g., 920 from processor 914 to memory 930).

Computer 900 can include an input/output (I/O) bridge, which can be connected to a memory interface, or to processor (not shown). An I/O bridge can interface the processors and/or memory devices of the computer 900 (or, other I/O devices) to I/O devices connected to the bridge. For example, controller 910 includes I/O bridge 950 interfacing memory interface 920 to I/O devices, such as I/O device 960. In some embodiments, an I/O bridge can connect directly to a processor or a memory, or can be a component included in a processor or a memory. An I/O bridge can be, for example, a peripheral component interconnect express (PCI-Express) or other I/O bus bridge, or can be an I/O adapter.

An I/O bridge can connect to I/O devices by means of an I/O interface, or I/O bus, such as I/O bus 922 of controller 910. For example, I/O bus 922 can be a PCI-Express or other I/O bus. I/O devices can be any of a variety of peripheral I/O devices or adapters connecting to peripheral I/O devices. For example, I/O device 960 can be a graphics card, keyboard or other input device, a hard disk drive (HDD), solid-state drive (SSD) or other storage device, a network interface card (NIC), etc. I/O device 960 can be an I/O adapter, such as a PCI-Express adapter, that connects components (e.g., processors or memory devices) of the computer 900 to I/O devices (e.g., disk drives, Ethernet networks, video displays, keyboards, mice, styli, touchscreens, etc.).

Computer 900 can include instructions executable by one or more of the processors (or, processing elements, such as threads of a processor). The instructions can be a component of one or more programs. The programs, or the instructions, can be stored in, and/or utilize, one or more memory devices of computer 900. As illustrated in the example of FIG. 9, controller 910 includes a plurality of programs or modules, such as UID status module 908 and UID assignment module 904. A program can be, for example, an application program, an operating system (OS) or a function of an OS, or a utility or built-in function of the computer 900. A program can be a hypervisor, and the hypervisor can, for example, manage sharing resources of the computer 900 (e.g., a processor or regions of a memory, or access to an I/O device) among a plurality of programs or OSes.

Programs can be "stand-alone" programs that execute on processors and use memory within the computer 900 directly, without requiring another program to control their execution or their use of resources of the computer 900. For example, controller 910 includes stand-alone program 908. A stand-alone program can perform particular functions within the computer 900, such as controlling, or interfacing (e.g., access by other programs) an I/O interface or I/O device. A stand-alone program can, for example, manage the operation, or access to, a memory (e.g., memory 930). A basic I/O subsystem (BIOS), or a computer boot program (e.g., a program that can load and initiate execution of other programs) can be a standalone program.

Controller 910 within computer 900 can include one or more OS 902, 906, and an OS can control the execution of other programs such as, for example, to start or stop a program, or to manage resources of the computer 900 used by a program. For example, controller 910 includes OSes 902 and 906, each of which can include, or manage execution of, one or more programs, such as OS 902 including (or, managing) program 904. In some embodiments, an OS can function as a hypervisor.

A program can be embodied as firmware (e.g., BIOS in a desktop computer, or a hypervisor) and the firmware can execute on one or more processors and, optionally, can use memory, included in the computer 900. Firmware can be stored in a memory (e.g., a flash memory) of the computer 900. For example, controller 910 includes firmware 940 stored in memory 930. In other embodiments, firmware can be embodied as instructions (e.g., comprising a computer program product) on a storage medium (e.g., a CD-ROM, DVD-ROM, a flash memory, or a disk drive), and the computer 900 can access the instructions from the storage medium.

In embodiments of the present disclosure, computer 900 can include instructions for the assignment of UIDs to users without collision. Controller 910 includes, for example, UID determination and assignment instructions 942, which can operate to assign UIDs and/or create user or administrator accounts at 944. The computer 900 can store the UID assignment instructions and/or the created user account information in a memory 930 of the computer 900, such as controller 910 storing the UID determination and assignment instructions 942 and assign UIDs and/or create user or administrator accounts 944 in memory 930.

The example computer system 900 and controller 910 are not intended to limiting to embodiments. In embodiments, computer system 900 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of ordinary skill in the art to include a variety of computing devices interconnected in a variety of manners in a computer system embodying aspects and features of the disclosure.

In embodiments, controller 910 can be, for example, a computing device having a processor (e.g., 912) capable of executing computing instructions and, optionally, a memory 930 in communication with the processor. For example, controller 910 can be a desktop or laptop computer; a tablet computer, mobile computing device, personal digital assistant (PDA), or cellular phone; or, a server computer, a high-performance computer (HPC), or a super computer. Controller 910 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the invention will be gained through a discussion of the examples provided.

It is understood that numerous variations of automatic UID assignment could be made while maintaining the overall inventive design of various components thereof and remaining within the scope of the disclosure. Numerous alternate design or element features have been mentioned above.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the invention, it is understood that the features are interchangeable between embodiments to arrive at automatic UID assignment, without collision, that includes features of different illustrated embodiments. It is further understood that although certain embodiments discussed above include the creation of accounts for administrative users in the LDAP protocol using the disclosed methods and structures.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A system, comprising:
a controller operatively connected to at least a memory device and a storage device, the controller configured to perform steps including:
receiving an initial range of user identification values for account generation;
determining a first hole range of the initial range of user identification values, the first hole range including a first minimum user identification value and a first maximum user identification value;
assigning a first user identification value from the first hole range of the initial range of user identification values to a first user based on the first minimum and maximum user identification values;
determining a second user identification value from the first hole range of the initial range of user identification values by incrementing the first user identification value based on the first minimum and maximum identification values; and
assigning the second user identification value to a second user.

2. The system of claim 1, wherein the controller is further configured to perform steps including:
creating a first user account based on the assigning the first user identification value to the first user; and
creating a second user account based on the assigning the second user identification value to the second user.

3. The system of claim 2, wherein the first user account includes login credentials including the first user identification value and a first user password.

4. The system of claim 1, wherein the controller is further configured to perform steps including:

determining whether the second user identification value is equal to the first maximum user identification value; and determining, if it is determined that the second user identification value is equal to the first maximum user identification value, a second hole range of the initial range of user identification values having a second minimum user identification value and a second maximum user identification value, wherein the second hole range is configured to maximize a number of consecutive values between the second minimum and maximum user identification values within the initial range.

5. The system of claim 1, wherein the initial range of user identification values of the first hole range are each available for assignment to a user.

6. The system of claim 1, wherein the first hole range of the initial range of user identification values is configured to maximize a number of consecutive values between the first minimum and maximum user identification values within the initial range.

7. The system of claim 1, wherein assigning the first user identification value to the first user based on the first minimum and maximum user identification values is assigned to the first minimum user identification value.

8. The system of claim 1, wherein the controller is further configured to generate user accounts with associated collision-free user identification values in a lightweight directory access protocol (LDAP) directory database.

9. An account generation method, comprising:
receiving an initial range of user identification values;
determining a first hole range of the initial range of user identification values, the first hole range including a first minimum user identification value and a first maximum user identification value;
assigning a first user identification value from the first hole range of the initial range of user identification values to a first user based on the first minimum and maximum user identification values;
creating a first user account based on the assigning the first user identification value to the first user;
determining a second user identification value from the first hole range of the initial range of user identification values by incrementing the first user identification value based on the first minimum and maximum identification values;
assigning the second user identification value to a second user; and
creating a second user account based on the assigning the second user identification value to the second user.

10. The method of claim 9, further comprising:
determining whether the second user identification value is equal to the first maximum user identification value; and
if it is determined that the second user identification value is equal to the first maximum user identification value, determining a second hole range of the initial range of user identification values having a second minimum user identification value and a second maximum user identification value, wherein the second hole range is configured to maximize a number of consecutive values between the second minimum and maximum user identification values within the initial range to implement a collision-free user identification value system.

11. The method of claim 9, wherein the initial range of user identification values are received in response to receiving a request for a user to gain access to a directory access protocol database.

12. The method of claim 9, wherein the first hole range of the initial range of user identification values is configured to maximize a number of consecutive values between the first minimum and maximum user identification values within the initial range.

13. The method of claim 9, wherein the first user account includes login credentials including the first user identification value and a first user password.

14. The method of claim 9, wherein assigning the first user identification value to the first user based on the first minimum and maximum user identification values is assigned to the first minimum user identification value.

15. A computer program product comprising a computer-readable storage device having a computer-readable program stored therein, wherein the computer-readable program, when executed on a computing device, causes the computing device to:
receive an initial range of user identification values;
determine a first hole range of the initial range of user identification values, the first hole range including a first minimum user identification value and a first maximum user identification value;
assign a first user identification value from the first hole range of the initial range of user identification values to a first user based on the first minimum and maximum user identification values;
create a first user account based on the assigning the first user identification value to the first user;
determine a second user identification value from the first hole range of the initial range of user identification values by incrementing the first user identification value based on the first minimum and maximum identification values;
assign the second user identification value to a second user; and
create a second user account based on the assigning the second user identification value to the second user.

16. The computer program product of claim 15, wherein the computer-readable program further causes the computing device to:
determine whether the second user identification value is equal to the first maximum user identification value; and
determine, if it is determined that the second user identification value is equal to the first maximum user identification value, a second hole range of the initial range of user identification values having a second minimum user identification value and a second maximum user identification value, wherein the second hole range is configured to maximize a number of consecutive values between the second minimum and maximum user identification values within the initial range.

17. The computer program product of claim 15, wherein the initial range of user identification values are received in response to receiving a request for a user to gain access to an LDAP directory database.

18. The computer program product of claim 15, wherein the first hole range of the initial range of user identification values is configured to maximize a number of consecutive values between the first minimum and maximum user identification values within the initial range.

19. The computer program product of claim 15, wherein the first user account includes login credentials including the first user identification value and a first user password.

20. The computer program product of claim 15, wherein assigning the first user identification value to the first user based on the first minimum and maximum user identification values is assigned to the first minimum user identification value.

* * * * *